United States Patent [19]

Ferrari et al.

[11] Patent Number: 5,601,762
[45] Date of Patent: Feb. 11, 1997

[54] METHOD FOR ENHANCING THE PROPERTIES OF A STRING USED IN A STRINGING DEVICE

[75] Inventors: Harry M. Ferrari, Pittsburgh; Ronald H. Carr, Monroeville, both of Pa.

[73] Assignee: Ferrari Importing Company, Mich.

[21] Appl. No.: 167,380

[22] Filed: Dec. 14, 1993

[51] Int. Cl.$^6$ .......................... B29C 35/10; B29C 71/00
[52] U.S. Cl. ................. 264/473; 156/180; 156/272.2; 264/136; 264/341; 264/470; 427/352; 427/551; 264/172.11; 264/173.19
[58] Field of Search ............................ 264/22, 129, 134, 264/136, 174, 232, 340, 341; 156/180, 272.2; 427/352, 551

[56] References Cited

U.S. PATENT DOCUMENTS

| | | | |
|---|---|---|---|
| 3,920,658 | 11/1975 | Benson | 428/395 |
| 4,012,557 | 3/1977 | Cornelis | 264/341 X |
| 4,015,133 | 3/1977 | Ferrari | 250/492.2 |
| 4,043,555 | 8/1977 | Conn | 273/73 D |
| 4,140,677 | 2/1979 | Uno et al. | 528/322 |
| 4,183,200 | 1/1980 | Bajaj | 57/234 |
| 4,275,117 | 6/1981 | Crandall | 428/373 |
| 4,391,088 | 7/1983 | Salsky et al. | 57/234 |
| 4,395,458 | 7/1983 | Huang | 428/367 |

*Primary Examiner*—Leo B. Tentoni
*Attorney, Agent, or Firm*—Michael R. Swartz; John R. Flanagan

[57] ABSTRACT

The invention relates to strings for stringed musical instruments, fishing equipment, and sports racquets which are exposed to a suitable solvent or suitable elasticizer compatible with the materials contained in the fibers, bonding resins, or coating resins in the strings, such that partial dissolution of the material in the suitable solvent occurs or absorption of the suitable elasticizer occurs so as to increase the elasticity, increase the flexibility, increase the ductility, or increase the resiliency of the strings.

22 Claims, 1 Drawing Sheet

METHOD FOR ENHANCING THE PROPERTIES OF A STRING USED IN A STRINGING DEVICE

BACKGROUND OF THE INVENTION

1. Field of the Invention

The present invention relates to a method for increasing the elasticity, flexibility, ductility, and resiliency of fibers, and strings for musical instruments, fishing equipment, and sports racquets.

2. Description of the Prior Art

For fibers and strings used on stringed musical instruments, fishing equipment, and stringed sports racquets, it is advantageous that the fibers and strings have a high degree of elasticity (low modulus of elasticity or low dynamic modulus of elasticity), flexibility, ductility, and toughness while having high breaking strength, resiliency (low internal damping), and abrasion resistance. In the case of a stringed musical instrument, these properties provide for a more durable string that can hold tension and a more consistent tone for a longer period of time. In the case of line for fishing equipment, these properties provide better feel, response, and durability. And in the case of sports racquets, these properties provide better feel, response, increased power, and lower shock resulting from the impact of the object being struck onto the bed of intersecting strings on the racquet.

The current fibers and strings used in this field are made of high strength metallic wires, natural gut fibers made from the intestines of animals, and synthetic fibers made from polymeric materials. The advantages and disadvantages of each are discussed in the following paragraphs. In general strings which are made from high strength metallic fibers offer high break strength, high resiliency, and high abrasion resistance, however they have the disadvantage of having high stiffness, low flexibility, and low ductility. As a result, when used for instance as a string for sports racquets, the low flexibility makes the strings difficult to install, the low ductility causes premature breakage, and the high stiffness (low elasticity) results in high impact forces transmitted to the hand and arm of the player.

Strings made from natural gut fibers offer a high degree of elasticity and resiliency, however they generally lack high breaking strengths and abrasion resistance, and when exposed to moisture in the form of water vapor contained in the air, they lose their strength and the ability to hold tension. Strings made from natural gut strings can be combined with synthetic materials in the form of fibers, bonding resins, and coating resins to improve strength and abrasion resistance, however, when synthetic materials are combined with the natural gut fibers there is in general a corresponding degradation in the elasticity and resiliency of the string. Since strings made from natural gut fibers are also generally more expensive, the performance value of the strings is greatly reduced with the addition of synthetic materials.

Strings made from synthetic fibers are currently the most commonly used due to their relatively low cost and the availability of the material and because the materials can be formulated or engineered to achieve a wide variety of properties. Synthetic strings which are designed for high strength and high abrasion resistance are made from fibers engineered to have higher strengths, and incorporate high strength bonding resins and coating resins. However, these strings also generally have correspondingly high elastic modulus and high dynamic modulus as a result of the viscoelasticity of polymeric materials. Synthetic strings which are designed to have lower stiffness are also generally made from fibers which have high strength and stiffness, however the construction of the string generally incorporates more fibers to build in more elasticity. Unfortunately, strings designed in this matter are generally less resilient, rapidly lose their elasticity over a short period of time, and can not hold tension for long periods of time.

It is also known that additives can be used to lower the stiffness properties of some synthetic polymeric materials at the polymerization stage. These additives also tend to reduce the strength of the bulk material. In addition, due to the extrusion process used to produce most synthetic fibers, additives which can be used to reduce the modulus of elasticity generally cannot be employed since they reduce the molecular weight of the material and adversely affect dimensional stability of the fiber as it is extruded.

Synthetic materials which can be extruded, which have a lower modulus of elasticity and lower dynamic modulus of elasticity, such as those listed in U.S. Pat. No. 4,586,708, generally have lower strengths which limits their application for use as strings for musical instruments, fishing equipment, or sports racquets.

It is also known that strings can be treated during or after manufacture of the string to alter the physical properties of the string. In U.S. Pat. No. 4,015,133, Ferrari discovered that irradiation of strings made from synthetic polyamide materials resulted in strings having higher resiliency, however there was only a minor effect on the modulus of elasticity of the material. It is also known that exposing some polymeric materials such as polyamides to water can soften strings, as a result of the water being absorbed into the material, however, the water also evaporates rapidly and the original physical properties of the material return.

Considering the current state of the art of strings for musical instruments, fishing equipment, and sports racquets there is still a need for an optimum string which provides an optimal combination of elasticity, strength, flexibility, abrasion resistance, ductility, and resiliency.

SUMMARY OF THE INVENTION

This invention arises from the discovery that exposing strings for stringed apparatus made in part of a polymer material (also commonly referred to as "synthetic strings"), to a suitable solvent which can cause controlled partial dissolution of the polymer, or to a suitable elasticizer which can be absorbed into the material and cause a permanent weakening of the intermolecular forces between molecules, results in greater flexibility, lower stiffness (lower dynamic modulus of elasticity or greater elasticity), and improved toughness (dynamic impact strength) of the strings. The invention also arises from the discovery that further subjecting the polymer strings which have undergone partial dissolution or have absorbed a suitable elasticizer, to irradiation produced by high energy particles such as gamma rays, results in higher dynamic resiliency (lower internal damping or dynamic loss modulus), and greater strength. The greater flexibility, lower stiffness, improved toughness, lower internal damping, greater dynamic elasticity, and higher strength provide improved performance for the stringed apparatus which employs strings of the present invention.

In conventional synthetic strings, the polymer materials used are typically polyamide, polyester, or other polymer materials which are formed into fibers having long chain molecular structures typically aligned (oriented) in the long direction of the fiber. The highly oriented, long chain molecular structures result in fibers having relatively high strength and stiffness. However, for stringed apparatus such as racquets used in tennis, squash, racquetball, badminton or the like, high stiffness is an undesirable property as it relates to the dynamics between the racquet, strings, and the item being struck.

By exposing the fibers used to construct the string, or the string constructed of the fibers, to a suitable solvent which will dissolve the polymer used to produce the fibers or string, a controlled dissolution of the polymer is initiated which breaks some of the intermolecular bonds to shorten the long chain molecules and reduce the intermolecular forces between molecules. The suitable solvents used are generally liquid in form, but can be gaseous or solid. The fiber or strings are immersed into the suitable solvent until the desired level of dissolution of the polymer has occurred. The suitable solvent can also be heated to increase the rate of dissolution. The reduction or intermolecular forces permits slippage between the molecular chains and when combined with the shortened molecules promotes disentanglement of the molecules resulting in increased flexibility, lower stiffness, and greater ductility for greater dynamic toughness.

One can also expose the fibers used to construct the string, or the string constructed of the fibers, to a suitable elasticizer, which is a material that is readily absorbed into the material and reacts with the molecules and atomic structure of the material to cause a permanent weakening of the intermolecular bonds in the material. The suitable elasticizer used are also generally liquid in form, but can be gaseous or solid. The fiber or strings are immersed into the suitable elasticizer until the desired amount of suitable elasticizer is absorbed. The suitable elasticizer can also be heated to increase the rate of absorption. The reduction of intermolecular forces permits slippage between the molecular chains resulting in increased flexibility, lower stiffness, and greater ductility for greater dynamic toughness.

One disadvantage of the dissolution and elasticizing process is that it causes reduced breaking strength and reduced surface hardness which reduces the life and wear resistance of the string materials. This can render strings made from some polymer materials unusable due to their poor durability. To overcome this disadvantage of reduced strength and surface hardness in some polymer materials, the fibers used to construct the string, or the string constructed of the fibers can be further exposed to high energy irradiation produced by electrons, neutrons, gamma rays, protons, alpha particles or other sources or a combination of these sources, such that cross linkage between molecules is promoted to a point where the surface hardness and strength is increased without significantly affecting the flexibility, stiffness, and impact toughness. In cases where suitable elasticizers have been used, the irradiation further polymerizes the material and unexpectedly improves the flexibility and impact toughness of some polyamides which have absorbed the suitable elasticizer. The typical irradiation doses are between one thousand and one billion rads but can be more or less depending on the materials involved.

The strings so treated with the suitable solvent or suitable elasticizer, or the suitable solvent or suitable elasticizer plus irradiation are then used in stringed apparatus such as stringed musical instruments, stringed fishing equipment, or stringed sports racquets.

BRIEF DESCRIPTION OF THE DRAWINGS

In the course of the following description, reference will be made to the attached drawings in which.

DETAILED DESCRIPTION OF THE INVENTION

Figure 1:
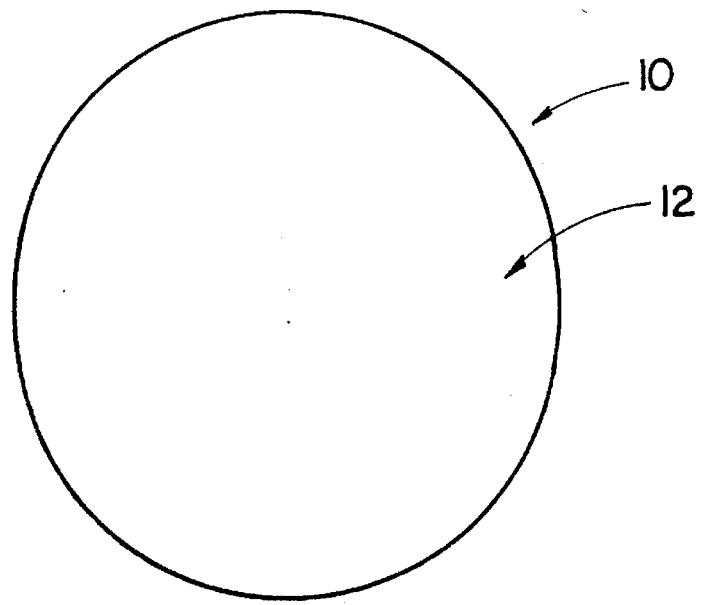
FIG. 1 is a cross sectional view of a monofilament string used for stringed musical instruments, fishing equipment, or sports racquets.

In the following description, like reference characters designate like or corresponding parts throughout the several views. Also in the following description, it is understood that terms such as "forward", "rearward", "left", "right", "upwardly", "downwardly", and the like, are words of convenience and are not to be construed as limiting terms.

Referring to FIG. 1, there is shown a cross sectional view of a monofilament string for stringed musical instruments, fishing equipment, or sports racquets, generally indicated by the numeral 10. The construction element of string 10 is comprised of a single fiber 12.

Figure 2:
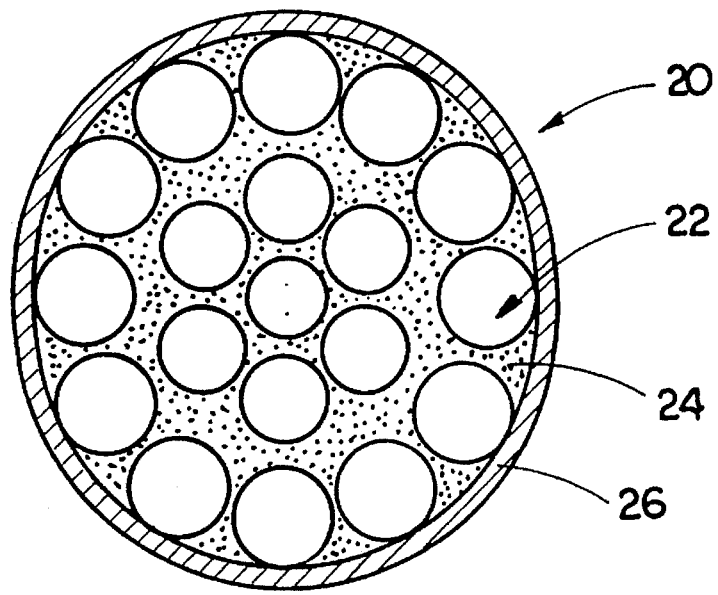
FIG. 2 is a cross sectional view of a multifilament string used for stringed musical instruments, fishing equipment, or sports racquets.

Referring now to FIG. 2, there is shown a cross sectional view of a multifilament string for stringed musical instruments, fishing equipment, or sports racquets, generally indicated by the numeral 20. The construction elements of string 20 are comprised of multiple fibers 22 arranged in a predetermined pattern, which are secured to one another with a bonding resin 26 to maintain their pattern. A coating resin 24 is applied to the arranged fibers 22 held together with a bonding resin 24 to protect the surface of the monofilaments from abrasion wear and from any ill effects caused by moisture, ultra violet light, or other environmental conditions.

It should be noted that the number of construction elements and the materials used in these construction elements to produce strings can vary both from string to string and within a string. FIG. 1 and FIG. 2 are shown merely as examples of string constructions and construction elements and in no way limits the scope of the present invention.

The present invention relates to methods of processing strings for stringed musical instruments, fishing equipment, or sports racquets so as to increase the elasticity (lower dynamic modulus of elasticity or lower dynamic stiffness), flexibility, ductility, or resiliency (lower internal damping or lower dynamic loss modulus), or a combination thereof, of the strings to improve or enhance the performance of the musical instrument, fishing equipment, or sports racquets. In the preferred embodiment, the fiber 12 of string 10, or at least one of the fibers 22, bonding resin 24, or coating resin 26 of string 20 are made from polymeric material comprised of a polyamide, polyester, polyetheretherketone, polyolefin, polyvinylidene fluoride, polyurethane, or a combination of these materials. The method involves immersing the string 10 or 22 into a suitable solvent, such as $HOCH_2 \cdot CHOH$ for nylon 6, which will partially dissolve the polymeric material. The suitable solvent is preferably at a temperature above 100° F. to reduce the time required to partially dissolve the polymeric material. The result of the partial dissolution of the material is a permanent increase in the elasticity, flexibility, ductility, or resiliency, or a combination thereof, of the string 10 or 20. Suitable solvents for other polymeric materials are well known by those skilled in the art and have not been specifically listed.

In a further embodiment the string 10 or 20, after being immersed in a suitable solvent, is further exposed to irradiation from energetic sources such as electrons, neutrons, gamma rays, alpha particles, protons, or other sources, or a combination of these sources, to levels such that the strength and abrasion resistance of the string 10 or its fiber 12, or string 20 is also increased.

In another embodiment, the fiber 12 of string 10 or at least one of the fibers 22 of string 20 are made from polymeric material comprised of a polyamide, polyester, polyetheretherketone, polyolefin, polyvinylidene fluoride, polyurethane, or a combination of these materials. The method involves immersing the fibers into a suitable solvent which will partially dissolve the polymeric material. The suitable solvent is preferably at a temperature above 100° F. to reduce the time required to partially dissolve the polymeric material. The result of the partial dissolution of the material is a permanent increase in the elasticity, flexibility, ductility, or resiliency, or a combination thereof, of the fibers. The fibers are then used to construct the string 10 or string 20.

In a further embodiment the fiber 12 or fibers 22, after being immersed in a suitable solvent, are further exposed to irradiation from energetic sources such as electrons, neutrons, gamma rays, alpha particles, protons, or other sources, or a combination of these sources, to levels such that the strength and abrasion resistance of the fiber 12 or the fibers 22 is also increased. The fiber 12 or fibers 22 are then used to construct the string 10 or string 20.

In yet another embodiment, the string 10 or 20, wherein at least one of the construction elements of string 20 such as, the fibers 22, bonding resin 24, or coating resin 26 are made from polymeric material comprised of a polyamide, polyester, polyetheretherketone, polyolefin, polyvinylidene fluoride, polyurethane, or a combination of these materials, is immersed into a suitable elasticizer, such as Di-2-ethylhexyl diphenyl phosphate for nylon 6, which is absorbed by the polymeric material of the string 10, or the fibers 22, bonding resin 24, or coating resin 26 of string 20. The suitable elasticizer is preferably at a temperature above 100° F. to increase the rate of absorption. The result of the absorption of a suitable elasticizer by the polymeric material is a permanent increase in the elasticity, flexibility, ductility, or resiliency, or a combination thereof, of the string 10 or 20. Suitable elasticizers for other polymeric materials are well known by those skilled in the art and have not been specifically listed.

In a further embodiment the string 10 or 20, after being immersed in a suitable elasticizer, is further exposed to irradiation from energetic sources such as electrons, neutrons, gamma rays, alpha particles, protons, or other sources, or a combination of these sources, to levels such that the strength and abrasion resistance of the string 10 or 20 is also increased.

In another embodiment, the fiber 12 of string 10, or at least one of the fibers 22 of string 20 are made from polymeric material comprised of a polyamide, polyester, polyetheretherketone, polyolefin, polyvinylidene fluoride, polyurethane, or a combination of these materials, and are immersed into a suitable elasticizer which is absorbed by the polymeric material of fiber 12 or 22. The suitable elasticizer is preferably at a temperature above 100° F. to increase the rate of absorption. The result of the absorption of the suitable elasticizer by the polymeric material is a permanent increase in the elasticity, flexibility, ductility, or resiliency, or a combination thereof, of the fibers, which are then used to construct the string 20.

In a further embodiment the fibers 22, after being immersed in a suitable elasticizer, are further exposed to irradiation from energetic sources such as electrons, neutrons, gamma rays, alpha particles, protons, or other sources, or a combination of these sources, to levels such that the strength and abrasion resistance of fibers 22 is also increased. The fibers 22 are then used to construct the string 20.

It is thought that the present invention and many of its attendant advantages will be understood from the foregoing summary and example. It will be apparent that various changes may be made in the form of the invention without departing from the spirit and scope of the invention or sacrificing all of its material advantages, the form herein before described being merely an example or exemplary embodiment thereof.

EXAMPLE

Laboratory tests and actual experience with a synthetic multi filament polyamide string produced in accordance with the present invention, revealed that a racquet containing strings either immersed in a suitable solvent or a suitable elasticizer in accordance with the present invention performed superior to racquets containing untreated synthetic strings in terms of a higher coefficient of restitution, longer dwell time (contact time between the ball and strings), and lower impact forces, and that racquets containing strings immersed in a suitable solvent or a suitable elasticizer followed by irradiation performed superior (higher coefficient of restitution, longer dwell time, and lower impact forces) to racquets containing strings which had only been immersed a suitable solvent or a suitable elasticizer. In fact the test racquets containing strings in accordance with the present invention performed superior (higher coefficient of restitution, longer dwell time, and lower impact forces) to racquets containing strings made from natural gut material, which historically has been considered to be the preferred racquet string material for performance by virtue of its high elasticity and high resiliency.

In the example presented, a 1.24 mm multifilament string made from fibers comprised of nylon 6 polyamide material, and suitable nylon 6 bonding resins, were immersed in chemical mixture of $HOCH_2 \cdot CH_2OH$ for over an hour at over 100° F. to cause partial dissolution of the nylon 6. After immersion in the solvent the strings were exposed to irradiation levels of over 1 million rads.

The effect of the immersion in $HOCH_2 \cdot CH_2OH$, and the immersion in $HOCH_2 \cdot CH_2OH$ plus irradiation, on the material properties of the example string is given in Table A.

TABLE A

| Performance Property | Un-treated | Immersed in $HOCH_2.CH_2OH$ | Immersion + Irradiation |
|---|---|---|---|
| Tensile Strength (ksi) | 83 | 77 | 79 |
| Elongation at 80 lbs (%) | 8.8 | 14.2 | 23.8 |
| Modulus @ 20 ksi (ksi) | 1,270 | 700 | 619 |
| Internal Damping @ 20 ksi (ksi) | 147 | 85 | 98 |

As observed in the results presented in Table A, the materials properties of the string have been enhanced and improved by the present invention.

The effect of the immersion in $HOCH_2 \cdot CH_2OH$ and the immersion in $HOCH_2 \cdot CH_2OH$ plus irradiation on the performance of the example string in a tennis racquet is given in Table B.

TABLE B

| Performance Property | Untreated | Immersed in HOCH$_2$.CH$_2$OH | Immersion + Irradiation |
|---|---|---|---|
| Coefficient of Restitution (%) | 79.5 | 80.4 | 80.5 |
| Dwell Time (millisecs) | 4.15 | 4.26 | 4.32 |
| Maximum Impact Force (lbs) | 416.1 | 414.7 | 408.8 |

As observed in the results presented in Table B, the performance of the sports racquet have been enhanced and improved by the present invention.

We claim:

1. A method for processing a string for use in a stringed device, said method comprising the steps of:

(a) providing a string having at least one fiber, said fiber including a material influencing the measurable physical properties of elasticity, flexibility, ductility, and resiliency of said fiber; and (b) contacting said material of said fiber with a solvent that causes partial dissolution of said material of said fiber for increasing at least one of said measurable physical properties thereof.

2. The method as recited in claim 1, wherein said material of said fiber is a polymeric material selected from the group consisting of a polyamide, polyester, polyetheretherketone, polyolefin, polyvinylidene fluoride, polyurethane, and a combination thereof.

3. The method as recited in claim 1, further comprising the step of:

heating said solvent to a temperature above 100° F.

4. The method as recited in claim 1, further comprising the step of:

irradiating said material of said fiber with an energetic source after contacting said material of said fiber with said solvent.

5. The method as recited in claim 4, wherein said irradiating is performed at a level falling within a range of from one thousand to one billion rads.

6. A method for processing a string for use in a stringed device, said method comprising the steps of:

(a) providing a string having a plurality of fibers arranged in a pattern, at least one of a bonding resin and a coating resin applied to said plurality of fibers, said bonding resin securing said plurality of fibers to one another to maintain said fibers in said pattern, said coating resin applied about said plurality of fibers to protect said fibers from external conditions, said plurality of fibers, said bonding resin and said coating resin thereby being construction elements of said string, at least one of said construction elements including a material influencing the measurable physical properties of elasticity, flexibility, ductility, and resiliency of said string; and (b) contacting said material of said at least one construction element with a solvent that causes partial dissolution of said material of said at least one construction element for increasing at least one of said measurable physical properties of said string.

7. The method as recited in claim 6, wherein said material of said at least one construction element is a polymeric material selected from the group consisting of a polyamide, polyester, polyetherketone, polyolefin, polyvinylidene fluoride, polyurethane, and a combination thereof.

8. The method as recited in claim 6, further comprising the step of:

heating said solvent to a temperature above 100° F.

9. The method as recited in claim 6, further comprising:

irradiating said material of said at least one construction element with an energetic source after contacting said material of said at least one construction element with said solvent.

10. The method as recited in claim 9, wherein said irradiating is performed at a level falling within a range of from one thousand to one billion rads.

11. The method as recited in claim 6, wherein both said bonding resin and said coating resin are applied to said plurality of fibers, said coating resin being applied about said plurality of fibers and said bonding resin.

12. A method for processing a string for use in a stringed device, said method comprising the steps of:

(a) providing a string having at least one fiber composed of nylon-6, said fiber including a material influencing the measurable physical properties of elasticity, flexibility, ductility, and resiliency of said fiber; and (b) contacting said material of said fiber with a Di-2-ethylhexyl diphenyl phosphate elasticizer that is absorbed by said material of said fiber for increasing at least one of said measurable properties thereof.

13. The method as recited in claim 12, wherein said material of said fiber is a polymeric material selected from the group consisting of a polyamide, polyester, polyetheretherketone, polyolefin, polyvinylidene fluoride, polyurethane, and a combination thereof.

14. The method as recited in claim 12, further comprising the step of:

heating said elasticizer to a temperature above 100° F.

15. The method as recited in claim 12, further comprising the step of:

irradiating said material of said fiber with an energetic source after contacting said material of said fiber with said elasticizer.

16. The method as recited in claim 15, wherein said irradiating is performed at a level falling within a range of from one thousand to one billion rads.

17. A method for processing a string for use in a stringed device, said method comprising the steps of:

(a) providing a string having a plurality of fibers arranged in a pattern and with at least one fiber being composed of nylon-6, at least one of a bonding resin and a coating resin applied to said plurality of fibers, said bonding resin securing said plurality of fibers to one another to maintain said fibers in said pattern, said coating resin applied about said plurality of fibers to protect said fibers from external conditions, said plurality of fibers, said bonding resin and said coating resin thereby being construction elements of said string, at least one of said construction elements including a material influencing the measurable physical properties of elasticity, flexibility, ductility, and resiliency of said string; and (b) contacting said material of said at least one construction element with a Di-2-ethylhexyl diphenyl phosphate elasticizer that is absorbed by said material of said at least one construction element for increasing at least one of said measurable physical properties of said string.

18. The method as recited in claim 17, wherein said material of said at least one construction element is a polymeric material selected from the group consisting of a polyamide, polyester, polyetheretherketone, polyolefin, polyvinylidene fluoride, polyurethane, and a combination thereof.

19. The method as recited in claim 17, further comprising the step of:

heating said elasticizer to a temperature above 100° F.

20. The method as recited in claim 17, further comprising:

irradiating said material of said at least one construction element with an energetic source after contacting said material of said at least one construction element with said elasticizer.

21. The method as recited in claim 20, wherein said irradiating is performed at a level falling within a range of from one thousand to one billion rads.

22. The method as recited in claim 17, wherein both said bonding resin and said coating resin are applied to said plurality of fibers, said coating resin being applied about said plurality of fibers and said bonding resin.

\* \* \* \* \*